March 9, 1965 C. R. JOHNSON ETAL 3,173,000

SYSTEM FOR SYNCHRONIZING PUNCHED CARD READERS

Filed Feb. 21, 1962 4 Sheets-Sheet 1

INVENTORS.
C. R. JOHNSON -AND-
C. H. PROPSTER, JR.
BY
A. M. Fernandez
ATTORNEY

March 9, 1965 C. R. JOHNSON ETAL 3,173,000

SYSTEM FOR SYNCHRONIZING PUNCHED CARD READERS

Filed Feb. 21, 1962 4 Sheets-Sheet 3

March 9, 1965 C. R. JOHNSON ETAL 3,173,000

SYSTEM FOR SYNCHRONIZING PUNCHED CARD READERS

Filed Feb. 21, 1962 4 Sheets-Sheet 4

United States Patent Office 3,173,000

Patented Mar. 9, 1965

3,173,000

SYSTEM FOR SYNCHRONIZING PUNCHED CARD READERS

Carl R. Johnson, Phoenix, Ariz., and Charles H. Propster, Jr., San Jose, Calif., assignors to General Electric Company, a corporation of New York Filed Feb. 21, 1962, Ser. No. 175,873
10 Claims. (Cl. 235—61.11)

This invention relates generally to apparatus for reading coded information on punched cards, and more particularly to an improved means for timing or synchronizing the transmission of information read column by column to a data processor.

A card reader does not generate a timing or synchronizing pulse in itself so that as a given card is read column by column, no signal of any kind is transmitted by the card reader when a blank column is read; consequently, there should be provided a way of determining that a column position has been scanned in order that all of the columns on the given card may be accounted for, thereby to determine not only when all of the columns on the card have been read, but also to determine that a blank column is read when a column contains information in accord with a particular format being employed.

In order that data read from a card may be synchronously transferred to a data processor, some system must be provided for generating a synchronizing pulse for each column position scanned. A standard punched card of one type is employed to store binary data in the form of punched holes, the holes being punched in predetermined positions arranged in a matrix of twelve rows and eighty columns. The data recorded is read column by column.

Many different codes are in common use for punched card recording, but the most widely used is the standard Hollerith code which utilizes only ten of the twelve rows for storing a decimal digit in a given column and all twelve rows for storing other characters such as letters of the alphabet and punctuation marks. It should be noted that in the Hollerith code, a blank column is employed to specify a space which, for the information stored on a given card, may have important significance, depending upon the format being employed.

In the past, synchronizing pulses have been provided by detecting a black mark printed on the margin of the card in line with each column. Such a system has the advantage of providing accurate synchronization but has the disadvantage of not being able to synchronize the reading of a punched card not having the black marks preprinted thereon.

Another system which has been provided in the past consists of a timing disc mounted on a shaft which is mechanically synchronized with the shaft of a feed-roller, the disc being provided with black marks or slots which may be detected photoelectrically to provide timing signals for synchronizing the transfer of data from the card reader to a data processor. The advantage of such a system is that the cards to be read need not be preprinted or otherwise prepared in advance with some column-identifying marks. However, such a system has the disadvantage of requiring a feed-roller which does not allow slippage between it and the card being read. If there is any slippage, the error introduced between two adjacent columns may not be serious but, as the entire card is read, the slippage between columns being cumulative, the total timing error for the last few columns may be sufficient to cause a synchronizing pulse to be generated when the space on the card between two adjacent columns is over the read station with the result that spaces are read out of those last few columns instead of the correct data stored therein.

Accordingly, an object of this invention is to provide an improved system for synchronizing the transfer of data from a card being read to a data processor. A more particular object of this invention is to provide for the resynchronization of the synchronizing system in response to signals derived from those columns scanned having holes punched therein.

In some card readers, the mechanism employed to feed a card from a hopper to the feed-roller may, for convenience or other advantageous reasons, be provided with a feeding arm or pusher which advances a card to be read toward the read station and the feed-roller in such a manner that one or more of the columns is read before the feed-roller engages the card. When the feed-roller engages the card, the card may undergo some changes in speed; accordingly, a timing-disc system for synchronizing the transfer of data read from a card in a reader having a feed mechanism of the pusher type cannot be employed to synchronize all eighty columns without difficulties.

Accordingly, another object of the invention is to provide separate synchronizing systems for synchronizing the transfer of data read from a card to a data processor in a card reader employing more than one type of mechanism to feed the card past the read station, a different synchronizing system being provided for each type of feed mechanism.

Still another object is to provide a means for effecting the transition from one synchronizing system to another without requiring the separate synchronizing systems to be synchronized with each other.

According to the present invention, two synchronizing systems are employed to synchronize the transfer of data read from a card column by column to a data processor. The first system is employed while the card is advanced past the read station by a cam-actuated feeding arm, after which a feed-roller engages the card. Four columns pass over the read station before the feed-roller engages the card. To synchronize the reading of those four columns, slits on the feeding arm are detected by a photoelectric cell in order to generate synchronizing pulses, one for each column passing over the read station. A second photoelectric cell is placed at the feed-roller in such a position as to detect when the feed-roller advances the card to a position which places the leading edge of the fifth column just beyond the first edge of slots at the read station. A signal from that photocell is employed to switch the card reader from the feeding-arm synchronizing system to a timing-disc synchronizing system.

The timing disc is provided with marks or slots on its periphery which are photoelectrically detected. Sufficient slots are provided to generate sixteen timing pulses between the leading edge of one column and the leading edge of the next column. A counter is provided to count the timing pulses and to recycle after sixteen pulses have been counted. When six pulses have been counted, the center of a given column to be read is approximately over the center of the slots at the read station. The next timing pulse causes a signal to be transmitted to the data processor for synchronizing the transfer of data. When the leading edge of the next column to be read passes the first edge of the slots at the read station, the counter normally recycles to zero in response to the timing signals from the timing disc; but, if the timing disc and the card get out of step due to slippage or other mechanical difficulty, the counter is automatically re-synchronized in accordance with the present invention by being reset to zero in response to the detection of the leading edge of any hole present in the column to be read next. If that column is blank, the counter is not re-synchronized at that time and will recycle in a normal manner at the approximate time when the leading edge of the next succeeding column enters the read station. Re-synchronization is again possible at that time by the leading edge of any punched hole present in that column.

If a succession of blank columns occurs, any timing error between the counter and the timing disc due to slippage between the card and the feed-roller may gradually increase; however, upon reading the next column having a punched hole, the counter is re-synchronized. In the meantime, as the counter automatically recycles in response to the timing pulses, synchronizing signals are generated and transmitted to the data processor which then synchronously effects the transfer of a blank which, in the Hollerith code, specifies a space. Since a space is the absence of a hole, no error can be made during the period that blank columns are read. The synchronizing signals generated for the blank columns may be counted in order to effectively account for all of the eighty columns read.

Other objects and advantages of the present invention will be apparent from the following specification taken in conjunction with the accompanying drawings in which.

Figure 1:
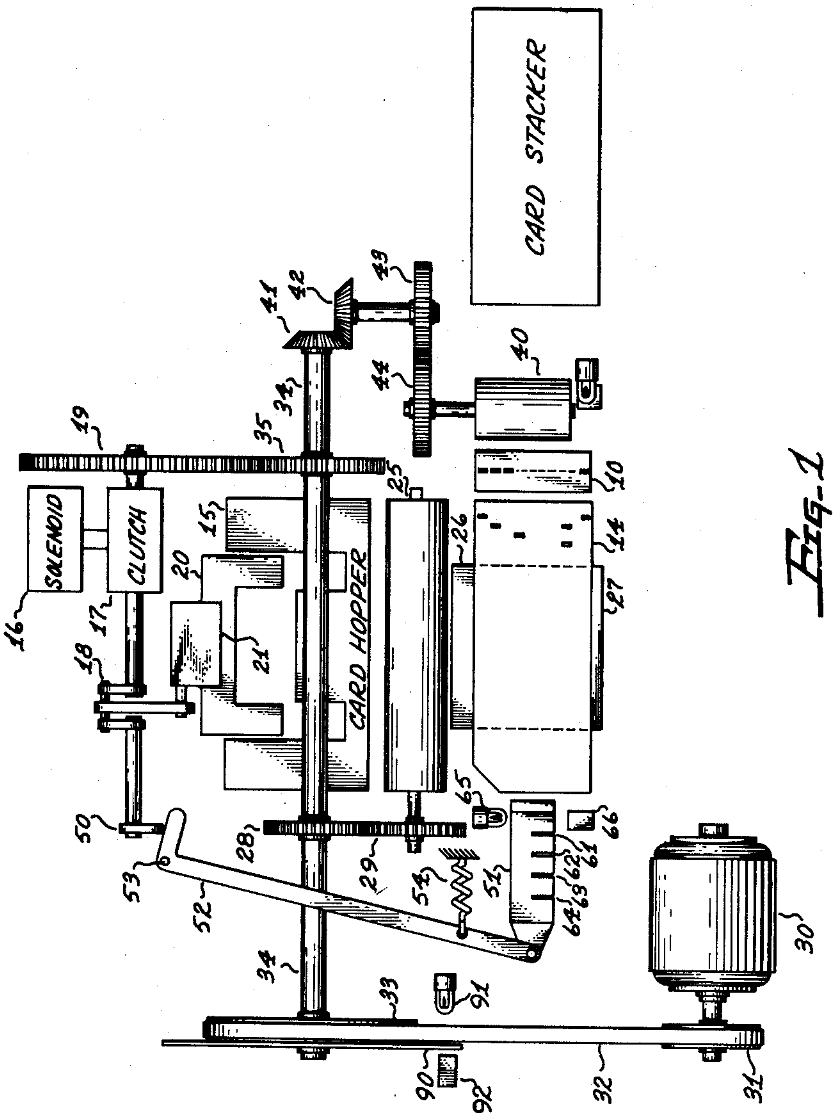
FIG. 1 is a schematic diagram of a card-reading mechanism.

The card-reading mechanism is schematically illustrated in FIG. 1 to show the relative position of the various components including gear trains and linkages. Since the card reader is a mechanical device, synchronizing signals may be most conveniently derived from it. Accordingly, synchronization of the transfer of data from the card reader to the data processor is accomplished by means of four photoelectric timing devices mechanically synchronized with the movement of a card being moved over a reading station 10 comprising twelve photocells and twelve lamps. The lamps (not shown) are mounted above the photocells which are embedded in a block and masked by a plate having only a narrow slot above each photocell. The lamps, the slots in the mask and the centers of the photocells are vertically aligned.

Figure 6:
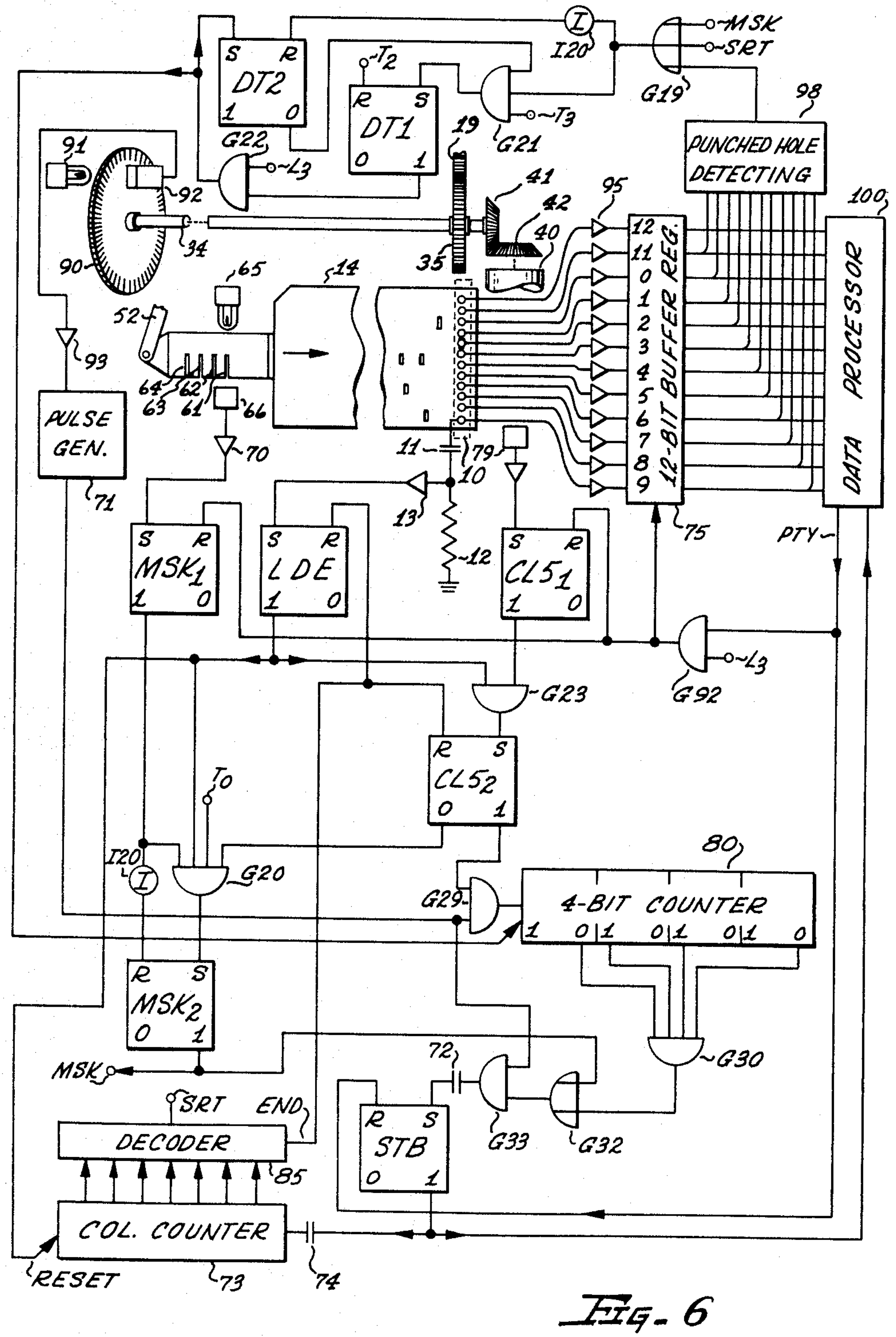
FIG. 6 is a logic diagram of a system for generating signals employed for synchronously transferring to a data processor data read from a card as it is advanced over a read station in response to two different feed mechanisms employed in succession.

The first photoelectric timing device is the leading-edge detector comprising the row-9 photocell in the reading station 10. As the card enters the reading station, light to the row-9 photocell is interrupted, thereby causing its output signal to rise from zero to +6 v. This change in voltage is coupled by a differentiating network comprising a capacitor 11 and a resistor 12 to an amplifier 13, as shown in FIG. 6. The output of the amplifier 13 is coupled to the set input terminal of the leading-edge detecting flip-flop LDE, thereby setting it and causing it to transmit from its "true" output terminal a signal which indicates that a card 14 is present for reading.

A card hopper 15 (FIG. 1) holds a stack of cards to be read. A solenoid 16 is momentarily energized (by means not shown) to selectively energize a single-revolution clutch 17 to connect a bell crank 18 to a spur gear 19 for one complete revolution in response to which a feed table 20 having a picker-knife edge 21 pushes the bottom card of a stack in the card hopper 15 to a driven roller 25 which transfers the card onto a sensing platform 26 having a rest bar or guide rail 27.

A motor 30 drives a gear train 28, 29 through a drive pulley 31, a belt 32, and a driven pulley 33. A common shaft 34 is employed to drive a spur gear 35 which is meshed with the spur gear 19 in order to drive the latter gear in synchronism with a feed-roller 40 via a gear train including gears 41, 42, 43 and 44.

When the clutch 17 is actuated for a single revolution and the bell crank 18 causes a card to be fed from the hopper 15 onto the sensing platform 26, a cam 50 causes a feeding arm or pusher 51 to advance the card on the sensing platform to the read station 10 via a lever 52 pivoted about a point 53 in response to the force of a spring 54. As the feed arm 51 advances the card to the read station 10, the first of four photoelectric timing devices for synchronizing the reading and transfer of data from the card is utilized.

Figure 2:
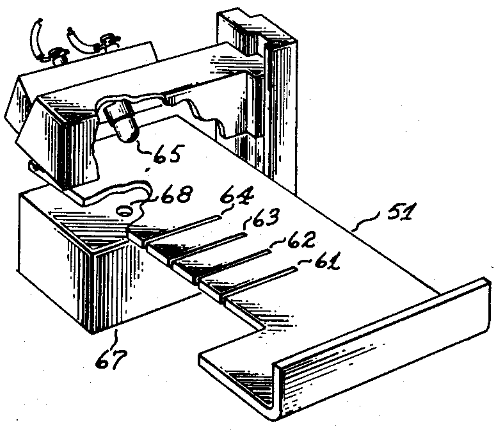
FIG. 2 is a schematic diagram in perspective of a feeding arm including a system for generating synchronizing signals employed in the card-reading mechanism of FIG. 1.

The feeding arm 51 has four slits 61 to 64 so spaced from the leading edge thereof as to allow a beam of light to pass from a lamp 65 to a photoelectric cell 66 as the first four columns of the card pass over slots in the mask at the read station 10. A schematic diagram of the feed arm and photoelectric cell arrangement is illustrated in perspective in FIG. 2. The feeding arm 51 is shown in the fully extended position which places the card in such a position that the fifth column is about to be read and the feed-roller 40 (FIG. 1) has engaged the card. The photoelectric cell 66 (illustrated schematically in FIGS. 1 and 6) is enclosed in an opaque container 67 (FIG. 2) having a small aperture 68. The card 14 is illustrated in FIG. 6 in a position for reading the first column so that light passes through the slit 61 to the photoelectric cell 66, thereby to produce a signal to be amplified by an amplifier 70 and employed to set a flip-flop $MSK_1$.

When the flip-flop $MSK_1$ is set, an AND-gate G20 is enabled to transmit a timing signal $T_0'$ (shown in FIG. 5) from the timing generator in the data processor 100 (FIG. 6) to an input terminal $T_0$ to set a second flip-flop $MSK_2$, thereby enabling another AND-gate G33 via an OR-gate G32 to transmit a timing pulse from a pulse generator 71. A capacitor 72 is employed to couple the AND-gate G33 to the set input terminal of strobe flip-flop STB in order that it be set only by the leading edge of a pulse from the generator 71.

The flip-flop $MSK_2$ is reset via an inverter I20 when the flip-flop $MSK_1$ is reset in order that the flip-flop STB not be reset and set again until the second slit 62 of the feeding arm 51 is detected and the second column of the card is over the read station.

While the flip-flop STB is set, a strobe or synchronizing signal is transmitted to the data processor 100 to request priority for reading into the data processor the first column of the card. That signal is also coupled to a column counter 73 by a capacitor 74 in order to increment it to the count of one, the column counter 73 having been reset to zero by the leading edge of the signal produced at the output terminal of the flip-flop LDE as it is set in response to the interruption of light at the ninth-column photoelectric cell of the read station by the leading edge of the card.

The schematic diagram of FIG. 6 consists of logic elements and memory devices in common use, such as AND and OR gates, flip-flops and binary counters. Circuits of suitable logic elements may be found described in such publications as Design of Transistorized Circuits for Digital Computers by A. I. Pressman, John F. Rider Publisher (1959), or Digital Computer Components & Circuits by R. K. Richards, D. Van Nostrand Co. (1957).

Figure 5:
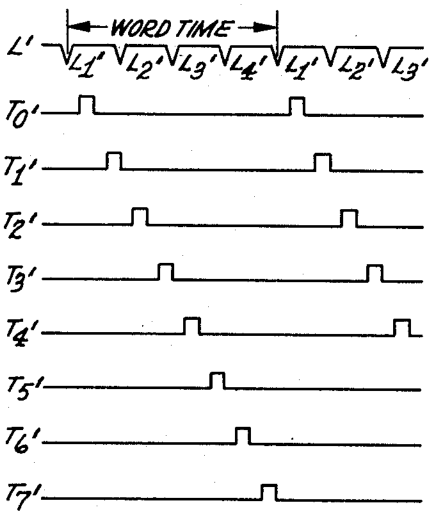
FIG. 5 is a timing diagram of signals from a basic timing-signal generator in a data processor illustrated in FIG. 6.

FIG. 5 is a timing diagram of the timing generator in the data processor 100 which produces a timing signal $T_0'$ at the input terminal $T_0$ of the AND-gate G20. The basic timing cycle of the data processor is denominated a word time, which is of 18 microseconds duration. A word time is divided into eight intervals $T_0$ to $T_7$, each T-time interval being approximately 2.25 microseconds. The timing generator is provided with separate generators for generating pulses $T_0'$ to $T_7'$ which occur during the respective word-time intervals $T_0$ to $T_7$. A word time is also divided into four equal intervals by pulses $L_1'$ to $L_4'$. Both the timing pulses $T_0'$ to $T_7'$ and $L_1'$ to $L_4'$ may be generated in the data processor by, for example, a ring counter, the characteristic of a ring counter being that only one of several flip-flops connected in a ring is set at any one time.

The signal from the set flip-flop STB applied to the data processor 100 may be employed to enable a group of AND-gates for parallel transfer of data read from the card into a buffer register in the data processor. However, in the present embodiment of the invention, a twelve-bit buffer register 75 is provided to store the binary digits from the column read until the data processor 100 is caused to receive them in response to a signal from the flip-flop STB. Accordingly, the signal from the flip-flop STB may be referred to as a request for priority, in response to which the data processor will, at the first opportunity, receive the data from the twelve-bit buffer register 75.

When the data processor 100 does receive the data from the twelve-bit buffer register 75, thereby granting the priority being requested by the signal from the flip-flop STB, a priority signal is transmitted over a line PTY to an AND-gate G92 and to the reset terminal of the flip-flop STB which is immediately reset, thereby terminating the priority-request signal to the data processor. Upon the occurrence of the next $L_3'$ pulse (FIG. 5) of the word time after the priority signal is transmitted to the AND-gate G92, the flip-flops $MSK_1$ and $MSK_2$ are reset.

As each of the remaining slits 62, 63 and 64 of the feeding arm 51 are detected by the photoelectric cell 66, the second, third and fourth rows are read in the same manner as just described for the first row. As the flip-flops $MSK_1$ and $MSK_2$ are set and then reset in response to $T_0'$ and $L_3'$ pulses, respectively, the column counter 73 is incremented once for each column read.

Figure 3:
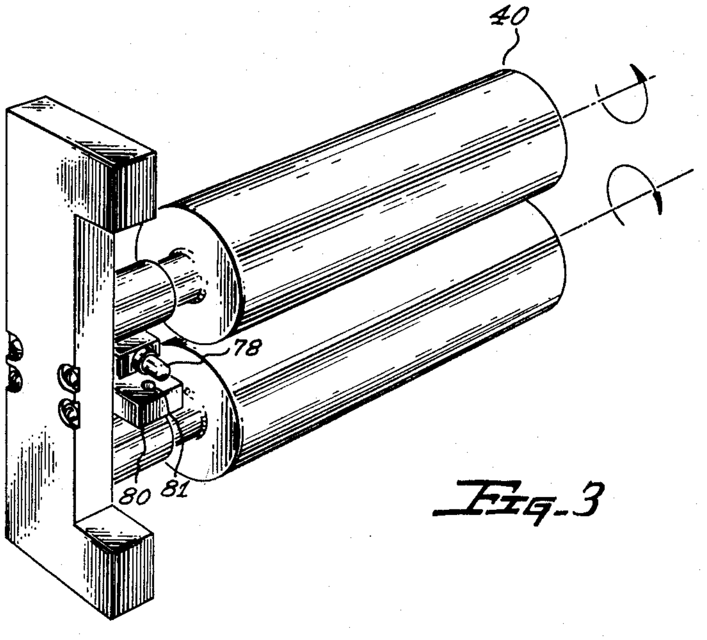
FIG. 3 is a schematic diagram in perspective of a feed-roller including means for photoelectrically detecting when the feed-roller has advanced a card to a predetermined point.

As the card is advanced to a position for reading the fifth column, a fifth-column detector comprising a lamp 78, shown in FIG. 3, and a photocell 79, schematically illustrated in FIG. 6 and enclosed within an opaque container 80 having an aperture 81 as shown in FIG. 3, detects when the leading edge of the card enters the feed-roller and sets a flip-flop $CL5_1$, illustrated in FIG. 6. A gate G23 is enabled when the flip-flop $CL5_1$ is set, thereby setting a flip-flop $CL5_2$ which in turn disables the AND-gate G20 and enables the AND-gate G29.

When the last slit 64 in the feeding arm 51 is detected and the flip-flop $MSK_1$ is set, thereby enabling the AND-gate G20 to transmit a $T_0'$ pulse applied to its input terminal $T_0$ to set the flip-flop $MSK_2$, a signal is transmitted from the "true" output terminal of the flip-flop $MSK_2$ to an output terminal MSK which is connected to an input terminal of an OR-gate G19. In that manner, an AND-gate G21 is enabled to transmit the next $T_3'$ pulse (illustrated in FIG. 5) applied to an input terminal $T_3$, thereby setting a data flip-flop DT1. Upon the occurrence of the next $L_3'$ pulse at an input terminal of an AND-gate G22, AND-gate G22 sets a second data flip-flop DT2 and resets a four-bit counter 80. Thereafter, a priority signal transmitted over the line PTY from the data processor 100 resets the flip-flop $MSK_1$ and resets the second flip-flop $MSK_2$ through an inverter I20 as described hereinbefore. In that manner, the four-bit counter 80 is reset to zero before the fifth column is read.

When the $MSK_2$ flip-flop is reset, the signal at the input terminal MSK of the OR-gate G19 terminates, thereby resetting the flip-flop DT2 through an inverter I20 and disabling the AND-gate G21. The flip-flops DT1 and DT2 are used to generate a signal for resetting the four-bit counter 80 in response to the detection of a punched hole in the remaining columns to be read.

After the leading edge of the card is detected by the photocell 79, the flip-flop $CL5_1$ is set and the flip-flop $CL5_2$ is set, the AND-gate G20 is disabled so that the flip-flop $MSK_2$ cannot be set again until the flip-flop $CL5_2$ has been reset. That flip-flop is not reset until all of the columns in the card have been read and counted by the column counter 73 to produce an end-of-count signal via a decoder 85 which is transmitted over a line END to reset not only the flip-flop $CL5_2$ but the leading-edge flip-flop LDE.

As noted hereinbefore, the photocell 79 is employed to detect the leading edge of the card as it is engaged by the feed-roller 40 in order that the flip-flops $CL5_1$ and $CL5_2$ may be set, thereby effecting the transition of synchronization by the feeding arm 51 to synchronization by the four-bit counter 80 which is actuated by a timing disc 90 via the timing-pulse generator 71. As the leading edge of the card passes between the lamp 78 and aperture 81 (FIG. 3), the flip-flop $CL5_2$, is set and the AND-gate G29 is enabled at the time that the leading edge of the fifth column in the card reaches the slots at the read station (FIG. 1) to enable timing pulses to be generated by the generator 71.

Figure 4:
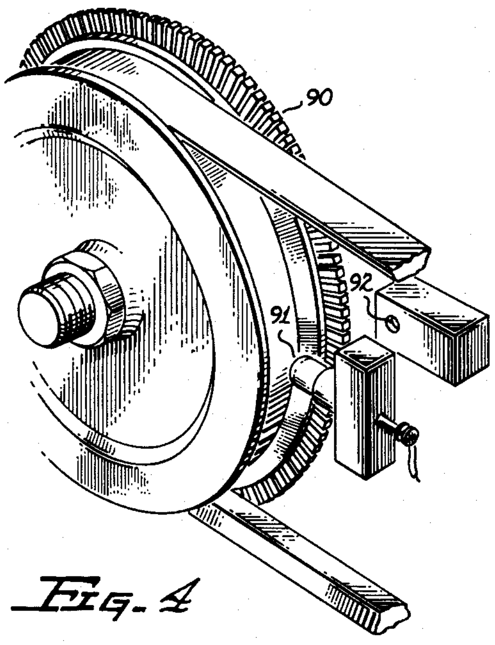
FIG. 4 is a schematic diagram in perspective of a timing disc employed for generating timing signals which are synchronized with the feed-roller of the card-reading mechanism illustrated in FIG. 1.
Figure 7:
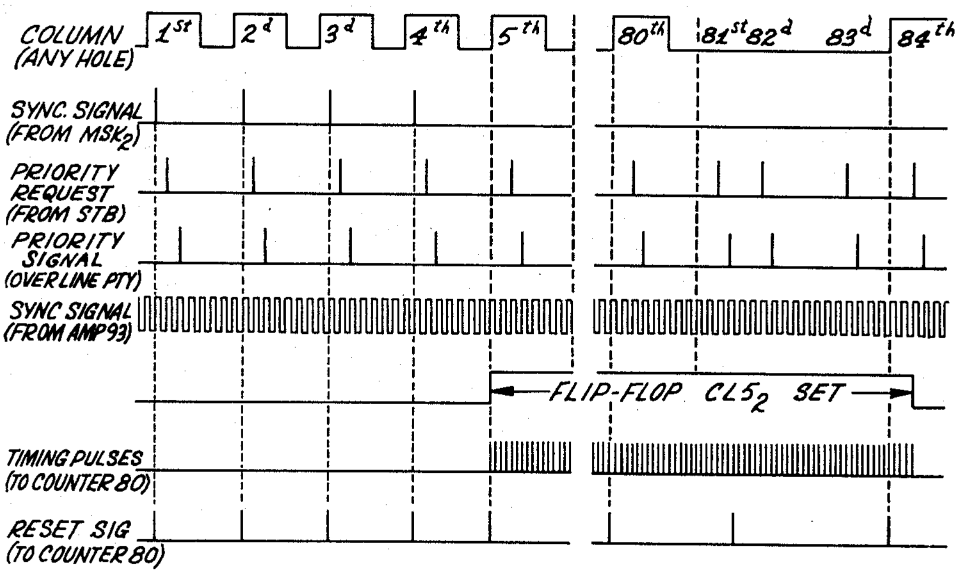
FIG. 7 is a timing diagram for the system illustrated in FIG. 6.

The timing disc 90 consists of a slotted metal disc affixed to the main drive shaft 34 and so positioned as to rotate between a lamp 91 and a photocell 92, as more clearly shown in FIG. 4, in order to continuously generate timing pulses. These pulses are in synchronism with the feed-roller 40 and, therefore, in synchronism with the linear movement of the card being read past the reading station. An amplifier 93 is provided to amplify the signals from the photocell 92. That amplifier is preferably designed to be alternately driven from cut-off to saturation such that the signal applied to the pulse generator is a train of square pulses as shown in the timing diagram of FIG. 7.

The number of slots on the periphery of the disc 90 is so selected as to provide eight square pulses between the time that the leading edge of one column passes the read station to the time when the leading edge of the next column passes the read station. The pulse generator 71 is designed to provide two pulses for each of the eight square pulses so that sixteen pulses are applied to the four-bit counter 80 in an interval of time between the passage of the leading edge of one column over the read station to the passage of the leading edge of the next column. Such a pulse generator may comprise, for example, an RC differentiating circuit to provide a positive and a negative-going pulse corresponding in time with the respective leading and trailing edges of each square pulse from the amplifier 93 and a means for inverting the negative pulses. The timing signals applied to the four-bit counter 80 via the AND-gate G29 are shown in the timing diagram of FIG. 7.

A gate G30 is employed to detect when the four-bit counter 80 has been incremented to the count of six in order to cause a stroke signal to be generated after six pulses from the pulse generator have been counted, thereby to generate a synchronizing priority-request signal at the time when the column to be read is approximately centered over the read station. The signal transmitted by the flip-flop STB when set requests priority in the data processor for the transfer of data read from the buffer register 75 and increments the column counter 73 as described hereinbefore. It should be noted that, although the priority-request signal is not generated until the column is centered over the read station, data present in the column read is sensed by the photoelectric cells, amplified by a group of twelve amplifiers 95 and stored in the twelve-bit buffer register 75 as soon as detected, which is as soon as the leading edge of the column to be read passes over the slits in the read station.

Once a priority signal is transmitted from the data processor over a line PTY, the flip-flop STB is reset and the AND-gate G92 is enabled to pass the next $L_3'$ pulse applied to its input terminal $L_3$. The $L_3'$ pulse transmitted by the AND-gate G92 resets the twelve-bit buffer register 75 and the flip-flop $CL5_1$. The flip-flop $CL5_2$ remains set until the flip-flop LDE is reset at the end of the card as noted hereinbefore. As long as the flip-flop $CL5_2$ remains set, the AND-gate G29 transmits pulses from the pulse generator 71 so that the counter is incremented from the count of zero to six and to the count of fifteen. In response to the next pulse, the four-bit counter 80 is recycled to the count of zero. The count of zero should be reached as the leading edge of the next column to be read reaches the read station. When the counter again reaches a count of six, another priority-request signal is generated and transmitted to the data processor 100. In that manner, the four-bit counter 80 performs the same function for the remaining columns as that performed by the feeding arm 51 in reading the first four columns.

Each time one or more punched holes are detected in a column read, the four-bit counter 80 is re-synchronized in accordance with the present invention. As just noted, re-synchronization of the four-bit counter is accomplished by detecting the leading edge of a punched hole in the column to be read and immediately resetting the four-bit counter so that when it reaches the count of six in response to the counting of signals from the pulse generator, the column to be read is centered over the read station. If no punched holes appear in a particular column, the four-bit counter 80 is not reset but continues to count until it reaches fifteen, after which it recycles to zero in response to the next timing pulse counted.

Timing of the four-bit counter 80 is accurate enough so that even if no punched holes appear in columns after the fifth column, the proper number of priority-request signals are transmitted by the flip-flop STB each time the counter 80 reaches the count of six. However, to be sure that the flip-flop STB is set when the column to be read is centered over the read station, the four-bit counter 80 is re-synchronized each time a column is read having a punched hole. Thus, any slippage between the card and the feed-roller 40 will be compensated for by the re-synchronization of the four-bit counter 80.

The detailed manner in which the four-bit counter 80 is re-synchronized by the presence of a punched hole in a column to be read is as follows. When the leading edge of a punched hole passes over a slot in the read station, a signal is amplified and stored in a corresponding flip-flop of the twelve-bit buffer register 75. The output terminals of the twelve-bit buffer register 75 are connected to a punched-hole detecting circuit 98 except the output terminal for the top, or twelfth row. The punched-hole detecting circuit 98 may comprise, for example, an eleven-input diode OR-gate such that any signal present at the output terminal of channels 0 to 9 and 11 will be transmitted thereby to an OR-gate G19.

The reason for not using the output signal from the twelfth row is that four extra columns are actually read in a manner to be described in order to provide four sentinel words following the word read from the eightieth column. As no columns are actually punched after the eightieth column, the flip-flop STB must be set in response to the operation of the four-bit counter 80, which should not be reset by any signal derived from the photocell of the twelfth row. Because punched cards are often cut in the upper left-hand corner as illustrated, it is imperative for the purpose of counting the assumed 81st, 82nd, 83rd and 84th columns that the four-bit counter 80 not be affected by the detection of light as the cut portion uncovers the slot for the twelfth-row photoelectric cell.

Signals received by the OR-gate G19 from the punched-hole detecting circuit 98 are transmitted to the AND-gate G21 to enable it to transmit the next $T_3'$ pulse applied to its input terminal $T_3$, thereby to set the flip-flop DT1 and enable the AND-gate G22. Upon the occurrence of the next $L_3'$ pulse applied to the input terminal $L_3$, the DT2 flip-flop is set. It should be noted that the first flip-flop DT1 remains set for almost one word time until the occurrence of a $T_2'$ pulse applied to an input terminal $T_2$ connected to its reset input terminal. As the flip-flop DT2 is set by an $L_3'$ pulse, the four-bit counter is reset, thereby re-synchronizing it upon the detection of a punched hole.

After the eightieth column has been read, the four-bit counter recycles to zero and continues to count the pulses from the pulse generator 71 until the count of six is reached, at which time the AND-gate G33 is enabled via the AND-gate G30 and the OR-gate G32 to transmit a signal from the pulse generator to set the flip-flop STB and advance the column counter 73 to the count of eighty-one. The count of eighty-one is decoded by the decoder 85 to produce a signal at an output terminal SRT which is utilized for a special re-synchronization of the four-bit counter 80. That output terminal SRT is connected to an input terminal of the OR-gate G19 so that the four-bit counter 80 is reset to zero without recycling through the remaining counts from seven to fifteen. Thus, six pulses are applied to the four-bit counter 80 to increment it to the count of six after the eightieth column has been read to produce the generation of a strobe pulse in response to the seventh timing pulse applied to the four-bit counter via gate G29 and the flip-flop STB via the gate G33, at which time the four-bit counter is reset to zero. Therefore, a priority-request signal is generated by the flip-flop STB again for the 82nd column after six additional pulses from the pulse generator 71 are counted, thereby shortening the period between the 81st and the 82nd column, as more clearly shown by the timing diagram of FIG. 7. That is necessary in order to be able to read eighty-four columns, eighty columns of data from the card and four additional sentinel words, the fourth sentinel word being the word read after the trailing edge of the card has passed the read station.

The priority-request signal for the 83rd column is generated in a normal manner after the four-bit counter 80 recycles from the count of six, reached during the 82nd column time, through zero to the count of six. The priority-request signal for the 84th column is finally generated in the normal manner.

It should be noted that as the last four priority-request signals are received and honored by the data processor 100, four successive sentinel words are transferred into the data processor, the first three of which represent spaces and the last of which is a word comprising twelve binary digits. The four sentinel words may then be examined either in series or in parallel to determine that all eighty-four columns have been read.

In summary, the four-bit counter 80 provides priority-request signals for synchronizing the transfer of information read from columns on a punched card to a data processor, the four-bit counter 80 being re-synchronized in response to the detection of the first leading edge of a hole punched in a given column being read. The advantage of re-synchronizing the four-bit counter 80 is the assurance of having a priority-request signal transmitted to the data processor 100 upon the flip-flop STB being set after the four-bit counter 80 is incremented to the count of six when the approximate center of the punched hole causing the re-synchronization of the four-bit counter is over the read station. This not only assures adequate time for the signal derived from the detection of that punched hole to be stored in the buffer register 75, but also for having other punched holes in the column detected even though their leading edges may be lagging the leading edge of the first punched hole to be detected.

The lagging of the leading edge of one punched hole relative to another may be due to a skewed position of the card as it is being fed past the reading station 10 or due to one hole having been punched at a different time, and perhaps even on a different machine, such that registration of the card while the two holes are punched separately may be different for each punching operation. Accordingly, a priority-request signal is not transmitted to the data processor 100 for synchronously transferring data from the buffer register 75 until after six timing pulses from the pulse generator 71 have been counted to place the leading edge of all of the holes in the column being read well over the read station. Since each channel of the buffer register 75 functions independently, the signal from each punched hole in the column being read is stored immediately after generation, all of the signals being generated and stored by the time the priority-request signal is transmitted to the computer 100. The computer 100 then has until the four-bit counter 80 recycles in response to the sixteenth timing pulse from the pulse generator 71 or is reset by the leading edges of the first hole detected in the next column to be read, whichever occurs first, to honor the priority-request signal and effect the transfer of the information from the buffer register 75 to the data processor 100.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for synchronizing the transfer of information from a reader of punched cards to a data processor, each card having information stored thereon in uniformly spaced columns, the combination comprising:

a read station including a plurality of electric means for translating information signals from respective rows of a given card being read column by column as said given card is fed past said read station;

a first means for feeding said given card past said read station;

a second means for generating timing pulses;

a third means for synchronizing said second means with said first means to cause said second means to generate a predetermined number of timing pulses in the time said first means requires to feed said card past said read station a distance equal to the distance between the centers of adjacent columns;

a timing-pulse counting means coupled to said second means for counting said timing pulses, said counting means having a base equal to said predetermined number of timing pulses;

a fourth means coupled to said counting means for detecting a specified count approximately equal to the number of timing pulses generated in the time said first means requires to advance said given card past said read station a distance approximately equal to half the width of a punched hole;

a fifth means coupled to said read station and responsive to any signal transmitted therefrom when the leading edge of a hole punched in a column being read is detected by an electric means of said read station for resetting said counting means, thereby re-synchronizing the actuation of said counting means; and a sixth means coupled to said fifth means for generating a signal adapted to be employed to effect a transfer of information from the column being read to a data processor.

2. In a system for synchronizing the transfer of information from a reader of punched cards to a data processor, each card having information stored thereon in uniformly spaced columns, the combination comprising:

a read station including a plurality of electric means for translating information signals from respective rows of a given card being read column by column as said given card is fed past said read station;

a first means for feeding said card past said read station until a predetermined number of columns have been read;

a second means synchronized with said first means for generating a signal adapted to be employed for synchronizing the transfer of information from said predetermined number of columns to said data processor;

a third means for feeding said card past said read station after said predetermined number of columns have been read;

a fourth means for generating timing pulses;

a fifth means for synchronizing said fourth means with said third means to cause said fourth means to generate a predetermined number of pulses in the time said third means requires to feed said card past said read station a distance equal to the distance allotted between the centers of adjacent columns;

a timing-pulse counting means coupled to said fourth means for counting said timing pulses, said counting means having a base equal to said predetermined number of timing pulses;

a sixth means coupled to said counting means for detecting a specified count approximately equal to the number of timing pulses generated in the time said third means requires to advance said card past said read station a distance approximately equal to half the width of a punched hole;

a seventh means coupled to said read station and responsive to a signal translated therefrom, when the leading edge of a hole punched in a column being read is detected by an electric means of said read station, for resetting said counting means, thereby re-synchronizing the actuation of said counting means;

an eighth means coupled to said sixth means for generating a signal adapted to be employed to effect a transfer of information from the column being read to a data processor;

an electric means for detecting when said card has been advanced by said first means to a position for reading the next column following said predetermined number of columns; and means responsive to said electric means for disabling said second means and for enabling said counting means to count said timing pulses.

3. In a system for synchronizing the transfer of information from a reader of punched cards to a data processor, each card having information stored thereon in uniformly spaced columns, the combination comprising:

a read station including a plurality of electric means for transmitting information from respective rows of a card being read column by column as a given card is fed past said read station, one electric means for each row of punched holes to be read from a given column of said card;

a buffer register coupled to said read station, said buffer register including for each electric means a bistable means for storing the information read from a row of a given column until reset;

a first means for feeding said card being read past said read station;

a second means for generating timing pulses in synchronism with said first means, said second means being adapted to generate a predetermined number of timing pulses in the time said first means requires to feed said card past said read station a distance equal to the distance between the centers of adjacent columns;

a counting means coupled to said second means for counting said timing pulses, said counting means being adapted to automatically reset when said predetermined number of timing pulses has been counted;

a third means coupled to said counting means for detecting a specified count approximately equal to the number of timing pulses generated in the time said first means requires to advance said card past said read station a distance approximately equal to half the width of a punched hole;

a fourth means connected to said buffer register and responsive to a signal stored therein for immediately resetting said counting means, thereby re-synchronizing the actuation of said counting means;

a fifth means coupled to said third means for generating a signal adapted to be employed by said data processor to effect a transfer of information from said buffer register to said data processor during the time said first means requires to advance said card past said read station sufficiently for the next column to be read; and a sixth means for resetting said buffer register upon said information being transferred to said data processor in response to a signal generated by said fifth means.

4. In a system for synchronizing the transfer of information fram a reader of punched cards to a data processor as defined by claim 3, wherein said fifth means comprises a bistable means adapted to be set by said third means upon said specified count being detected and adapted to be reset by said sixth means upon said buffer register being reset.

5. In a system for synchronizing the transfer of information from a reader of punched cards to a data processor, each card having information stored thereon in uniformly spaced columns, the combination comprising:

a read station including a plurality of electric means for transmitting information from respective rows of a card being read column by column as a given card is fed past said read station, one electric means for each row of punched holes to be read from said card;

a buffer register coupled to said read station, said buffer register including for each electric means a bistable means for storing the information read from a row of a given column until reset;

a first means for feeding said card past said read station until a predetermined number of columns have been read;

a second means synchronized with said first means for generating a signal adapted to be employed to effect a transfer of information from said buffer register to said data processor during the time required to advance said card past said read station sufficiently for the next column to be read, thereby synchronizing the transfer of information from said predetermined number of columns to said data processor;

a third means for feeding said card past said read station after said predetermined number of columns have been read;

a fourth means for generating timing pulses in synchronism with said third means, said fourth means being adapted to generate a predetermined number of timing pulses in the time said fourth means requires to feed said card past said read station a distance equal to the distance between the centers of adjacent columns;

a counting means coupled to said fourth means for counting said timing pulses, said counting means being adapted to automatically reset when said predetermined number of timing pulses have been counted;

a fifth means coupled to said counting means for detecting a specified count approximately equal to the number of timing pulses generated in the time said third means requires to advance said card past said read station a distance approximately equal to half the width of a punched hole;

a sixth means connected to said buffer register and responsive to a signal stored therein for immediately resetting said counting means, thereby re-synchronizing the actuation of said counting means;

a seventh means coupled to said fifth means and to said second means for generating a signal adapted to be employed by said data processor to effect a transfer of information from said buffer register to said data processor during the time required to advance said card past said read station sufficiently for the next column to be read; and an eighth means for resetting said buffer register upon said information being transferred to said data processor in response to a signal generated by said seventh means.

6. In a system for synchronizing the transfer of information from a reader of punched cards to a data processor as defined by claim 5, wherein said seventh means comprises a bistable means adapted to be set by said second means upon a signal being generated thereby and by said fifth means upon said specified count being detected and adapted to be reset by said eighth means upon said buffer register being reset.

7. In a system for synchronizing the transfer of information from a reader of punched cards to a data processor, each card having a specified number of $n$ columns stored thereon, the combination comprising:

a read station including a plurality of electric means for translating information signals from respective rows of a given card being read column by column as said given card is fed past said read station;

a first means for feeding said given card past said read station;

a second means for generating signals adapted to be used for synchronizing the transfer of information from a given card to said data processor column by column, said second means including a timing signal generator mechanically synchronized with said feeding means to produce a predetermined number of timing pulses in the time required to feed said card past said read station a distance equal to the distance between the centers of adjacent columns, a counter for counting said timing pulses, said counter having a base equal to said predetermined number of timing pulses, and means for detecting a specified count approximately equal to the number of timing pulses generated in the time said feeding means requires to advance said given card a distance approximately equal to half the width of a punched hole;

a second counter coupled to said second means and adapted to count the signals generated for synchronizing the transfer of information read from said card to said data processor;

means for detecting when said second counter has been incremented to the count of $n+m$, where $m$ is a number less than $n$ and one more than the number of columns read between the $n$th column of said card and its trailing edge; and means responsive to said detecting means for disabling the generation of synchronizing signals in response to the signal generated for synchronizing the transfer of information read from the effective $m$th column just beyond the trailing edge of said card, whereby $m$ sentinel words comprising a series of words, all but the last of which are blank, may be transferred to said data processor for determining that all $n$ columns of said card have been read.

8. In a system for synchronizing the transfer of information from a reader of punched cards to a data processor, the combination as defined in claim 7 further comprising a means coupled to said read station and responsive to any signal transmitted therefrom when the leading edge of a hole punched in any row of a column being read is detected for resetting said counter, thereby resynchronizing the actuation of said counter upon reading any column having a hole punched therein.

9. In a system for synchronizing the transfer of information from a reader of punched cards to a data processor, each card having a specified number $n$ of columns stored thereon, the combination comprising:

a read station including a plurality of electric means for translating information signals from respective rows of a given card being read column by column as said given card is fed past said read station;

a first means for feeding said given card past said read station;

a second means for generating signals adapted to be used for synchronizing the transfer of information from a given card to said data processor column by column, said second means including a timing signal generator mechanically synchronized with said feeding means to produce a predetermined number of timing pulses in the time required to feed said card past said read station a distance equal to the distance between the centers of adjacent columns, a counter for counting said timing pulses, said counter having a base equal to said predetermined number of timing pulses, and means for detecting a specified count approximately equal to the number of timing pulses generated in the time said feeding means requires to advance said given card a distance approximately equal to half the width of a punched hole;

a second counter coupled to said second means and adapted to count the signals generated for synchronizing the transfer of information read from said card to said data processor;

means for detecting when said second counter has been incremented to the count of $n+m$, where $m$ is a number less than $n$ and one more than the number of columns read between the $n$th column of said card and its trailing edge, and for detecting when said counter has been incremented to a specified count between $n$ and $n+m$;

means responsive to said detecting means for resetting said counter when said specified count between $n$ and $n+m$ is detected, whereby the signal adapted to be used for synchronizing the transfer of information from a next column is generated earlier at a time determined by said second means after said counter is reset; and means responsive to said detecting means when said specified count of $n+m$ is detected for disabling the generation of synchronizing signals in response to the signal generated for synchronizing the transfer of information read from the effective $n$th column just beyond the trailing edge of said card whereby $m$ sentinel words comprising a series of words, all but the last of which are blank, may be transferred to said data processor for determining that all $n$ columns of said card have been read.

10. In a system for synchronizing the transfer of information from a reader of punched cards to a data processor, each card having a specified number $n$ of columns stored thereon, the combination comprising:

a read station including a plurality of electric means for translating information signals from respective rows of a given card being read column by column as said given card is fed past said read station;

a first means for feeding said given card past said read station;

a second means for generating signals adapted to be used for synchronizing the transfer of information from a given card to said data processor column by column, said second means including a timing signal generator mechanically synchronized with said feeding means to produce a predetermined number of timing pulses in the time required to feed said card past said read station a distance equal to the distance between the centers of adjacent columns, a counter for counting said timing pulses, said counter having a base equal to said predetermined number of timing pulses, means coupled to said read station for resetting said counter in response to any signal from any one of specified rows, and means for detecting a specified count approximately equal to the number of timing pulses generated in the time said feeding means requires to advance said given card a distance approximately equal to half the width of a punched hole;

a second counter coupled to said second means and adapted to count the signals generated for synchronizing the transfer of information read from said card to said data processor;

means for detecting when said second counter has been incremented to the count of $n+m$, where $m$ is a number less than $n$ and one more than the number of columns read between the $n$th column of said card and its trailing edge, and for detecting when said counter has been incremented to a specified count between $n$ and $n+m$;

means responsive to said detecting means for resetting said counter when said specified count between $n$ and $n+m$ is detected, whereby the signal adapted to be used for synchronizing the transfer of information from a next column is generated earlier at a time determined by said second means after said counter is reset; and means responsive to said detecting means when said specified count of $n+m$ is detected for disabling the generation of synchronizing signals in response to the signal generated for synchronizing the transfer of information read from the effective $n$th column just beyond the trailing edge of said card whereby $m$ sentinel words comprising a series of words, all but the last of which are blank, may be transferred to said data processor for determining that all $n$ columns of said card have been read.

References Cited by the Examiner

UNITED STATES PATENTS 3,076,599 2/63 Smith.

MALCOLM A. MORRISON, *Primary Examiner.*

DARYL W. COOK, *Examiner.*